May 20, 1958
C. W. HAYES
2,835,471
SECURING OF BLADING TO TURBINE WHEELS AND OTHER
HIGH SPEED ROTARY MEMBERS
Filed Feb. 9, 1953
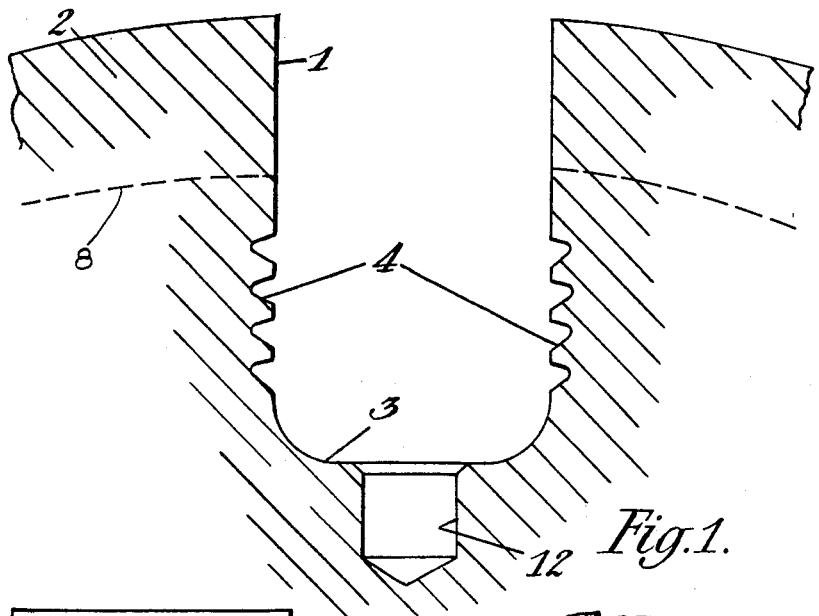
Fig. 1.
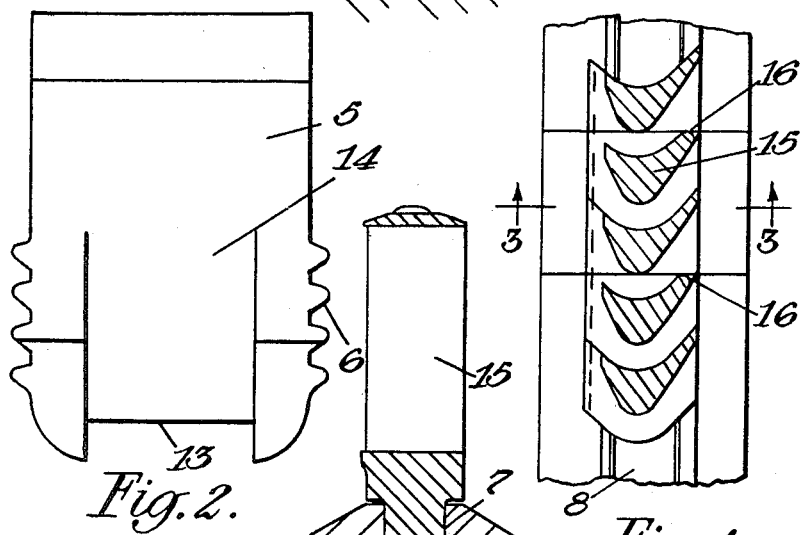
Fig. 2.
Fig. 3.
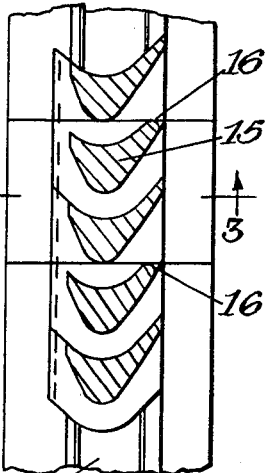
Fig. 4.
Inventor,
Claude W. Hayes,
by Hall & Houghton
Attorney

United States Patent Office 2,835,471
Patented May 20, 1958

2,835,471

SECURING OF BLADING TO TURBINE WHEELS AND OTHER HIGH SPEED ROTARY MEMBERS

Claude W. Hayes, Bedford, England, assignor to W. H. Allen Sons & Company Limited, Bedford, England Application February 9, 1953, Serial No. 335,860

Claims priority, application Great Britain February 26, 1952

8 Claims. (Cl. 253—77)

This invention relates to the securing of blading to turbine wheels and other high speed rotary members by the use of undercut circumferential grooves in the rim of the wheel or other rotary member into which are fitted the complementary root portions of the blading elements. The undercut sides of such grooves are generally of serrated or similar section mating with corresponding serrated forms of the blade root portions. To enable the blade elements to be introduced into the circumferential grooves it is necessary to provide one or more lateral gaps or so-called gates. A difficulty which arises is that of securing the last blading element or elements to be inserted, which lie adjacent the gap or gate, since the root portion of such element or elements will have little or no undercut engagement with the side of the circumferential groove in which the gap is situated. One common mode of meeting this difficulty is to omit the final blading element and thereby interrupt the sequence of the blading, and to fill the space thus left between the assembled blade root portions at this point by means of a copper or other plug which is driven into engagement with the exposed undercut groove portions or serrations. Such arrangements suffer from obvious disadvantages, the efficiency of the blading being reduced by the interruption and the plug method of closing being unsuitable and unreliable under high speeds and also under high temperatures. It is the object of the present invention to provide an improved blading securing means which is particularly applicable to wheels or other rotary members having relatively narrow rims and which obviates the above disadvantages in a convenient and relatively simple manner. Another object is to provide an improved blade securing means which permits blade replacements to be effected when required.

The invention can be applied with particular advantage to steam turbine wheels of the Rateau type such as are used for the intermediate stages of impulse turbines, but is not restricted thereto and may be employed for other high speed bladed rotary members where similar problems occur.

The invention comprises a block or closing piece carrying the final blade or blades and formed so that it can be inserted laterally into a gate or entry slot in the circumferentially grooved rim of the wheel or other rotary member to bring the blade or blades on said block or closing piece into alignment with the previously inserted blading, the block or closing piece having undercut engagement with the sides of the gate or entry slot to retain it radially, and means for retaining the block or closing piece laterally in position.

The invention also comprises blade securing means according to the preceding paragraph in which the gate or entry slot extends completely across the rim of the wheel or rotary member so that the block or closing piece can be inserted from either side thereof.

The undercut engagement formation for radial retention of the block or closing piece preferably comprises serrations in the sides of the gate or entry slot which mate with complementary serrations along the lower part of the block.

In a preferred arrangement according to the invention the block or closing piece is grooved to receive the final blade or blades which are engaged therein by an undercut formation, preferably by mating serrations, and the said groove is shaped to constitute a continuation of the circumferential wheel or rotary member groove when the block or closing piece is in position in the gate or entry slot. The block or closing piece is preferably shaped so that it completely fills the said gate or entry slot so that the wheel rim appears to be continuous when the block is in position.

The lateral retaining means for the block or closing piece may comprise a locking member or strip engaged laterally in the wheel rim and an end or ends of the member are deformed by bending or otherwise to engage the block. In a preferred arrangement the locking member or strip has a projection engaging in a radial recess in the wheel rim and lies in a groove formed in the base of the block or closing piece. Preferably the said groove is extended into the sides of the block to receive the ends of the locking strip when these are deformed by bending so that outward projections on the wheel rim are avoided.

In the accompanying drawing which illustrates one possible embodiment of the invention, Figure 1 is a sectional end elevation of part of a turbine wheel showing the gate or entry slot;

Figure 2 is an elevation of the block or closing piece;

Figure 3 is a cross section of the turbine wheel rim taken on the line 3—3 of Figure 4 showing the closing piece or block in position and carrying blading;

Figure 4 is a developed plan view of Figure 3.

In carrying the invention into effect according to one convenient mode, as applied by way of example to a steam turbine wheel of the Rateau type, having a circumferential groove 8 in the wheel rim formed with undercut grooves or serrations which mate with similar formations on the blade roots to lock the blades radially, a gate or entry slot 1 (see Figure 1) is formed to extend completely across the wheel rim 2, the base 3 of the slot lying well below the base of the aforesaid circumferential groove 8. The width of the gate is such that the blading can be inserted in the usual manner. The lower part of the sides of the gate are formed with undercut grooves or serrations 4. The gate preferably lies parallel with the wheel axis. A block or closing piece 5 (Figure 2) is provided to slide into the gate and is shaped so that when in position it substantially occupies the whole thereof, so that the wheel appears to be continuous. The block or closing piece also has undercut grooves or serrations 6 which mate with the gate serrations 4 to retain the block radially against centrifugal forces. The upper part of the block or closing piece 5 has a groove 7 shown in Figure 3 which, when the block or closing piece is in position in the gate, forms a continuation of the circumferential wheel groove 8 (Figure 4) and has similar lateral undercut grooves or serrations 9.

To retain the block or closing piece 5 in position laterally, i. e. in the direction of the wheel axis, a locking member or strip 10 is provided having a projection 11 at its centre which can be engaged in a radial recess 12 in the base of the entry slot or gate, preferably at the centre thereof. Also the base of the block or closing piece 5 has a groove 13 extending completely across it to receive the locking strip which is preferably straight and is dimensioned to project outwardly at each side of the wheel when positioned across the gate. The block or closing piece 5 is inserted into the gate by sliding over the locking strip which has been previously positioned as shown in Figure 3, and the ends of the latter can then be deformed by bending to engage the sides of the block which is thereby retained laterally through the engagement of the locking strip projection in the wheel recess. The ends of the strip before bending are shown in broken lines in Figure 3. Preferably the groove 13 is continued outwardly at 14 into the sides of the block in a radially outward direction to receive the deformed or bent up ends of the strip and thereby avoid projections on the side of the wheel rim.

The dimensions of the block or closing piece in the circumferential direction are such as to accommodate at least one blade therein, but if desired the said dimension may be such as to receive two or more final closing blades as seen in Figure 4. The blading is assembled in the circumferential wheel groove 8 by inserting the blades through the gate, the block or closing piece being removed for this purpose, and the annular series of blades being completed except for the gap represented by the gate. One or more blades 15, as may be required, are inserted into the groove 7 in the block or closing piece to occupy the full extent of such groove. The straight locking strip 10 is placed across the gate or entry slot with its projection 11 engaged in the corresponding recess 12 in the base thereof, and the bladed block is then inserted by sliding laterally into the gate so that the blades thereon are in alignment with the previously inserted blading in the wheel. It will be understood that the blade roots of the whole series of blades, including the blade or blades in the block, form a contiguous annular series. The block is then secured laterally by bending up the ends of the locking strip 10 as previously described.

In some instances, particularly where the block or closing piece is arranged to receive two or more blades, it may be found that if certain blades are given their full profile their edges would extend over the boundaries between the block and the wheel rim. To obviate this difficulty the edges of such blades may be slightly shortened as seen at 16 in Figure 4.

The formation of the serrations or undercut formation in the blade receiving groove of the closing piece, which groove forms a continuation of the circumferential wheel groove, is preferably effected at the same time as the formation of the serrations in the said circumferential wheel groove.

It will be understood that the invention is not restricted to the example described above and that in particular the means for retaining the block or closing piece in the gate may take various forms.

By this invention there is provided a means of securing blading in turbine and like wheels which affords an uninterrupted ring of blades together with adequate mechanical strength in the neighbourhood of the final blade or blades.

I claim:

1. In a bladed high speed rotary member having an undercut circumferential groove within which complementary root portions of the blades are engaged and having at least one gate opening laterally from said groove through which the blade root portions can be introduced, a blade securing means for the purpose described comprising a closing piece shaped for lateral insertion into the gate opening, undercut interengaging means on the said closing piece and on the sides of the gate opening to retain the closing piece radially in position therein, said interengaging means on the sides of the gate opening being disposed radially inwardly of the circumferential groove of the rotary member, said closing piece having an undercut blade receiving groove of the same cross sectional form as that of the circumferential groove of the rotary member and positioned to be in alignment with the latter groove, at least one blade member substantially identical to the blades in the aforesaid circumferential groove and having its root portion located in the closing piece groove and aligned with said blades in the circumferential groove, and means for retaining the closing piece in the gate, said means being constituted by parts engaged respectively with the closing piece and with the rotary member to prevent lateral movement of the closing piece in the said rotary member.

2. Blade securing means according to claim 1, in which the gate opening extends radially inwardly with respect to the circumferential groove, and the interengaging means on the sides of the said gate opening and on the closing piece positioned therein lie radially inwardly with respect to the base of the circumferential groove.

3. Blade securing means according to claim 1, in which the gate opening extends completely across the rim of the rotary member so that the closing piece can be inserted from either side thereof.

4. Blade securing means according to claim 2, in which the undercut interengagement for radial retention of the closing piece comprises serrations in the sides of the gate opening which mate with complementary serrations along the lower part of the closing piece.

5. Blade securing means according to claim 1, in which the closing piece is shaped so that it completely fills the gate opening.

6. Blade securing means according to claim 1, in which the means for retaining the closing piece in the gate comprises a locking member of strip form having two opposite ends, parts on the locking member and on the rotary member being shaped for interengagement to prevent lateral movement of the locking member relative to the rotary member, said locking member having its ends deformed by bending to engage the ends of the closing piece.

7. Blade securing means according to claim 1, in which the means for retaining the closing piece in the gate opening comprises a locking member of strip form having two opposite ends and having a projection engaged in a radial recess in the rotary member and said locking member lying in a groove in the base of the closing piece, the locking member having its ends deformed by bending to engage the ends of the closing piece.

8. Blade securing means according to claim 1, in which the means for retaining the closing piece in the gate opening comprises a locking member of strip form having a projection engaged in a radial recess in the rotary member and said locking member lying in a groove in the base of the closing piece, said groove being extended into the ends of the closing piece and the ends of the locking member being deformed by bending into the said extended groove portions to engage the ends of the closing piece.

References Cited in the file of this patent

UNITED STATES PATENTS

| 2,386,527 | Wiberg | Oct. 9, 1945 |
| 2,410,588 | Phelan | Nov. 5, 1946 |
| 2,434,935 | Kroon | Jan. 27, 1948 |

FOREIGN PATENTS

| 157,414 | Switzerland | Dec. 1, 1932 |
| 613,667 | Great Britain | Dec. 1, 1948 |
| 826,332 | Germany | Dec. 27, 1951 |